(12) United States Patent
Facchini

(10) Patent No.: US 8,072,154 B2
(45) Date of Patent: Dec. 6, 2011

(54) DEVICE FOR SUPPLYING POWER TO LED DIODES

(75) Inventor: Gianni Facchini, San Carlo (IT)

(73) Assignee: O.C.E.M. S.p.A., S. Giorgio di Piano (Bologna) (IT)

( * ) Notice: Subject to any disclaimer, the term of this patent is extended or adjusted under 35 U.S.C. 154(b) by 400 days.

(21) Appl. No.: 12/444,897

(22) PCT Filed: Oct. 10, 2007

(86) PCT No.: PCT/IB2007/003005
§ 371 (c)(1),
(2), (4) Date: Apr. 9, 2009

(87) PCT Pub. No.: WO2008/044120
PCT Pub. Date: Apr. 17, 2008

(65) Prior Publication Data
US 2010/0102737 A1    Apr. 29, 2010

(30) Foreign Application Priority Data

Oct. 11, 2006  (IT) .............................. B02006A0700

(51) Int. Cl.
*H05B 37/02* (2006.01)
(52) U.S. Cl. ............... 315/209 R; 315/250; 315/279; 315/287; 315/295; 315/302
(58) Field of Classification Search ............ 315/209 R, 315/210–212, 224–226, 246, 250, 276, 279, 315/287, 294–295, 302
See application file for complete search history.

(56) References Cited

U.S. PATENT DOCUMENTS
4,412,277 A    10/1983   Mitchell
(Continued)

FOREIGN PATENT DOCUMENTS
DE    10013215A1    9/2001

OTHER PUBLICATIONS
International Search Report mailed on Jan. 4, 2008 for PCT/IB2007/003005.
(Continued)

*Primary Examiner* — Jason M Crawford
(74) *Attorney, Agent, or Firm* — William J. Sapone; Coleman Sudol Sapone P.C.

(57) ABSTRACT

A device for supplying diodes LED includes an electric bridge (ABHG) with input terminals (A, B) and output terminals (H, G), including diodes ($DS_1$, $DS_2$) interposed between branches (AH, BH), with cathodes turned toward the terminal (H); Two MOSFET elements ($M_1$, $M_2$) are interposed between the branches (AG, BG). A capacitor (C) is derived between the terminals (H) and (G). A switch ($K_R$) and LED diodes arranged in series, with their anodes oriented toward the terminal (H), and a first current sensor ($S_1$) are arranged along a derived branch (R), between the terminals (H) and (G). An electric control unit (CE) receives in input feedback control signals coming from the first sensor ($S_1$) and operates opening/closing of the switches ($M_1$) and ($M_2$), as well as of the branch switch ($K_R$) in suitable relation with the trend of the alternating current ($i_z$), to obtain a predetermined trend of the branch current ($i_r$) for power supplying the LED diodes.

19 Claims, 4 Drawing Sheets

U.S. PATENT DOCUMENTS

| | | | |
|---|---|---|---|
| 4,745,343 A * | 5/1988 | Beggs | 315/246 |
| 4,831,508 A | 5/1989 | Hunter | |
| 5,416,387 A * | 5/1995 | Cuk et al. | 315/209 R |
| 5,670,848 A * | 9/1997 | Lidstrom | 315/282 |
| 2002/0030455 A1 | 3/2002 | Ghanem | |
| 2004/0041526 A1 | 3/2004 | Vollrath | |
| 2005/0030192 A1 | 2/2005 | Weaver | |

OTHER PUBLICATIONS

Itoh R. et al: "Single Phase Sinusoidal Converter Using MOSFET", IEEE Proceedings B. Electrical Power Applications, Institution of Electrical Engineers. Stevenage, GB, vol. 136, No. 5, part B, Sep. 1989 (Sep. 1989), pp. 237-242.

* cited by examiner

DEVICE FOR SUPPLYING POWER TO LED DIODES

FIELD OF THE INVENTION

The present invention relates to the light sources technical field, for example light sources situated along airport runways; more particularly, the invention concerns the relevant devices for supplying power to LED diodes (one or more LED connected in series or in parallel) integrated in each of the same sources.

DESCRIPTION OF THE PRIOR ART

Currently, light sources SI (see FIG. 1, prior art) are arranged in cascade along an electric circuit E, supplied with power in turn by an alternating current regulation unit (not shown), whose function is to supply power, on the basis of information coming, for example, from the control tower (likewise not shown), an imposed current $i_z$ of selected characteristics, for example with RSM value varying according to a defined range of values, corresponding to the lighting levels required in the runway. Each light source SI includes, substantially: a current transformer TA, whose primary winding is connected in cascade along the electric circuit E; a supply device DAN, shunted from the secondary winding of the transformer TA; and one or more LED diodes, supplied with power by the same device DAN and connected in series or parallel.

The supply devices DAN, of known type, in turn, are composed of: an AC/DC rectifier, connected to the secondary winding of the transformer TA, aimed at converting the induced current $i_j$ in a direct voltage of fixed value at its output; and a DC/DC stage (o more stages) in cascade with respect to the AC/DC rectifier to convert the direct voltage, at its input, in a square-wave unidirectional pulsating current $i_r$, aimed at supplying the LED diodes (Light Emitting Diode, in the enclosed figures indicated with the acronym "LED"). The pulsating current $i_r$, in case, for example, of the LED diodes arranged in cascade with respect to one another, assumes values included between zero and the nominal value $I_N$ of the current of the same diodes (for example, equal to 1.5 A or 750 mA), with a medium value depending on the RSM value of the induced current $i_j$, (that is on that of the imposed current $i_z$), taking into consideration transformation ratio of the TA), gathered by the associated current sensor S, situated upstream of the AC/DC rectifier along the line supplied by the secondary winding of the transformer TA.

This medium value of the pulsating current $i_r$, (varying between zero and the relative value of the LED diodes nominal current $I_N$) determines the irradiation intensity of the light emitted by the LED diodes in the time unit, depending on the effective RSM value of the imposed current $i_z$ supplied by the regulation unit and thus determined by the lighting level required in the runway. Anyway, it is known to those skilled in the art, that "the information" concerning the lighting level required in the runway can be use to control the frequency, rather than the RSM effective value of the imposed current $i_z$: in this case, the task of the stage DC/DC would be that of delivering a pulsating current $i_r$, having a medium value that is a function of the frequency of the induced current $i_j$.

SUMMARY OF THE INVENTION

The object of the present invention is to propose a power supply device for LED diodes, which is newly conceived and which is composed of a smaller number of elements, with respect to the solutions of known type, and, at the same time, causing more limited energy losses; within this meaning, it is intended to propose a power supply device having an energy efficiency and reliability certainly higher than the prior art ones.

Another object of the present invention is to propose a device for supplying power to LED diodes, whose costs are relatively limited with respect to the advantages to be obtained.

The above mentioned objects are obtained, in accordance with the contents of the claims, by a power supply device for LED diodes, powered by an electric source supplying an alternating current, characterized in that it includes: an electric bridge, having a first and a second input terminals supplied by the above mentioned electric source, including in turn: a first element, interposed between said first input terminal and a first output terminal of said bridge, for the unidirectional conduction of current from said first input terminal to said first output terminal; a second element, interposed between said second input terminal and said first output terminal, for the unidirectional conduction of current from said second input terminal to said first output terminal; a first switch, interposed between said first input terminal and a second output terminal of said electric bridge, for the conduction of current between said first input terminal to said second output terminal; a second switch, interposed between said second input terminal and said second output terminal, for the conduction of current between said second input terminal to said second output terminal;

a capacitor element of selected value, connected between said first and second output terminals of said electric bridge;

a branch connected between said first and second output terminals of said electric bridge, along which there are, connected in cascade at least a switch, one or more said LED diodes arranged in series and/or in parallel, with their anodes oriented toward said first output terminal, and sensor means connected to said branch for sensing a representative physical quantity, associated to the latter;

and an electric control unit, which receives in input the feedback control signal, coming from said sensor, and which is aimed at controlling the opening/closing of said first and second switch, as well as of said branch switch depending on said alternating current trend and for obtaining a predetermined trend of said branch current for supplying said LED diodes.

BRIEF DESCRIPTION OF DRAWINGS

The characteristic features of the invention, not appearing from what has been just said, will be better pointed out in the following description, in accordance with the contents of the claims and with help of the enclosed figures, in which:

DESCRIPTION OF PREFERRED EMBODIMENTS

Figure 1:
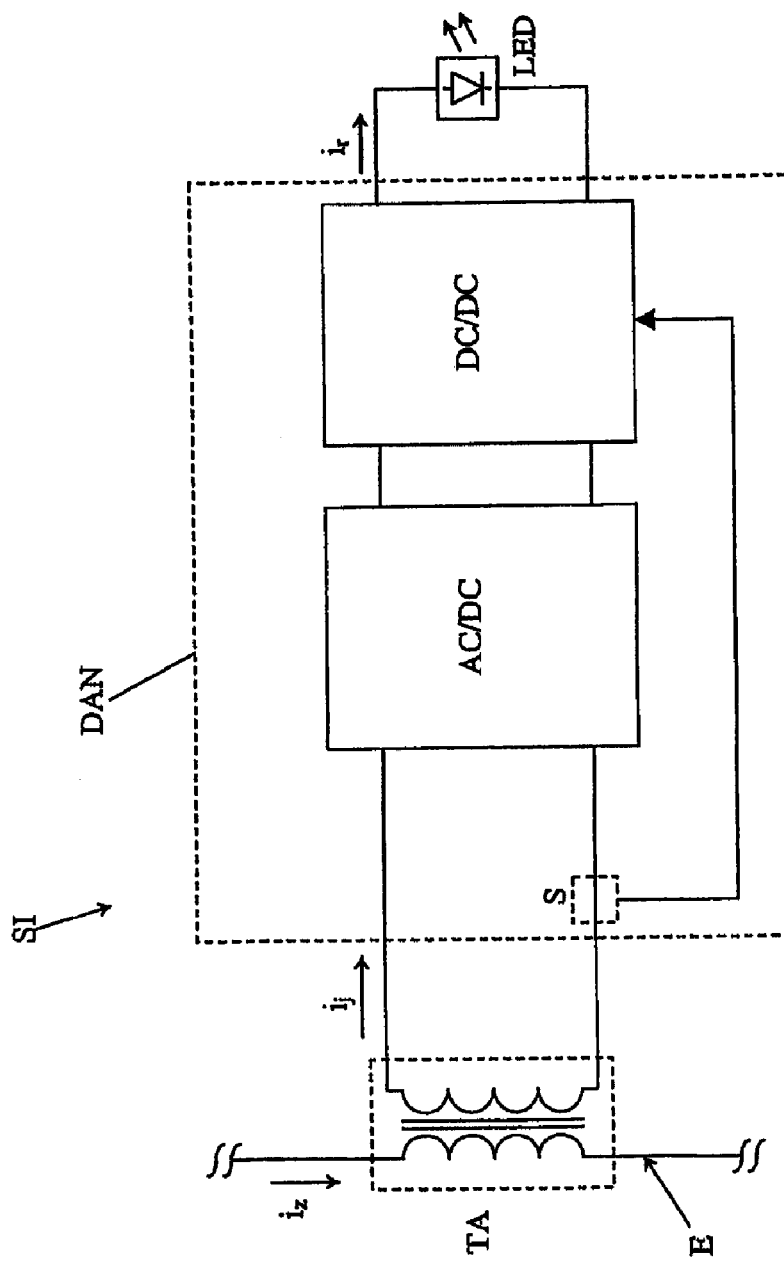
FIG. 1 is a block diagram of a light source SI, including a supply device DAN, according to the prior art.

In the following description, in regard to FIGS. 2, 3, 4, some numerical references already defined in FIG. 1 (prior art) will be maintained, since relevant to components, electric signals or electric quantities commonly used from the operation point of view.

Figure 2:
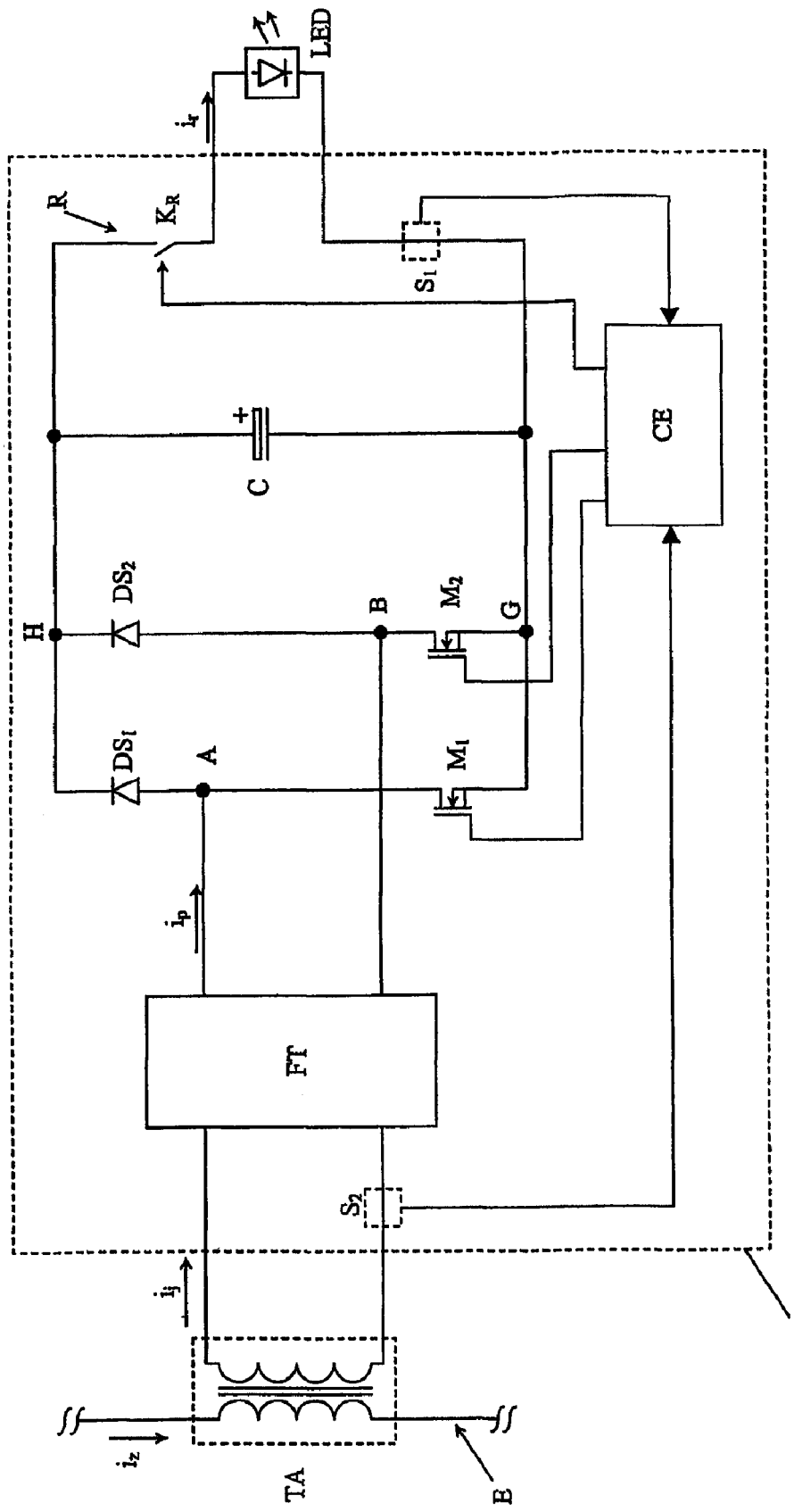
FIG. 2 is a block diagram of a light source SI, including the supply device DA, proposed by the present invention, according to a preferred embodiment.

Now, with reference to FIG. 2, DA indicates the proposed supply device of the LED diodes, which is connected to the secondary winding of the transformer TA. As it has been specified in the introductory note, the latter has its primary winding connected in cascade along the electric circuit E, where the imposed alternating current $i_z$ circulates, having frequency for example of 50 Hz and supplies a corresponding induced current $i_j$ on the secondary winding.

The device DA for power supplying the LED diodes includes an electric bridge ABHG, having a first and a second input terminals, indicated with A, B, as well as a first and a second output terminals, indicated with H, G, respectively, and is composed of diodes, first DS1 and second DS2 (for example of Schottky type), or other elements for unidirectional conduction of current, arranged respectively between the first input terminal A and the first output terminal H and the between the second input terminal B and the first output terminal H, having their catode oriented toward the same output terminal H; and two MOSFET elements, or first and second switch $M_1$, $M_2$ for current conduction, arranged respectively between the first input terminal A and the second output terminal G and between the second input terminal B and the second output terminal G, connected as shown in FIG. 2. Moreover, the device DA includes: a FT filter for reduction of the harmonic distortion produced by the same device DA, situated upstream of the electric bridge ABHG; a polarized capacitor C derived between the first H and the second G output terminals, with the relative positive pole turned toward the first output terminal H; a branch R shunted between the first H and the second G output terminals, along which there are arranged in cascade at least a switch $K_R$, one or more said LED diodes arranged for example in series, with their anodes oriented toward the first output terminal H, and a first sensor $S_1$ for sensing the current $i_r$ circulating in the branch R; a second sensor $S_2$ for sensing the induced current $i_j$ supplied by the secondary winding of the transformer TA; and finally an electric control unit CE, which receives in input the signals, coming from the first sensor $S_1$ and from the second sensor $S_2$, controls the operation of the MOSFET $M_1$, $M_2$ (see connection with the respective GATE in FIG. 2), that is the opening/closing of the equivalent first switch $M_1$ and second switch $M_2$, and controls also the opening/closing of the switch $K_R$, in a way described later.

The operation of the supply device DA, proposed by the present invention will be now described.

As specified, the task of the regulation unit (not shown, as not relevant to the invention) is to supply and keep constant an imposed alternating current $i_z$ on the basis, for example, of the information coming from the control tower, concerning the lighting level required in the runway, depending on the moment of the day and the contingent atmospheric conditions (twilight, night, day, hostile weather conditions, etc.); therefore, there is a biunique correspondence between the effective RSM value (and/or frequency) of the imposed current $i_z$ and the required lighting level. Within this meaning, the second sensor $S_2$ is aimed at transmitting to the control unit CE a signal, representing, under consideration of a scale factor (actually, it detects the induced current $i_j$ corresponding to the imposed current $i_z$ by the transformation ratio of the TA), the imposed current $i_z$, from which it is possible to calculate the intensity of the light irradiation that must be emitted by the LED diodes and thus the intensity of current (in this case, the branch current $i_r$, since they are supposed to be connected in series), which must be applied thereto.

Therefore, the control unit CE is aimed at regulating, according to the signal sent by the second sensor $S_2$ and to the feedback signal of the branch current $i_r$ sent by the first sensor $S_1$, the operation of the switches $M_1$, $M_2$, $K_R$, in order to obtain a pulsating branch current $i_r$, which in the predetermined commutation period $T_{CR}$ of the switch $K_R$ varies between a null value and a value equal to the nominal one $I_N$ of the LED diodes, arranged in series on the same branch R.

Figure 3:
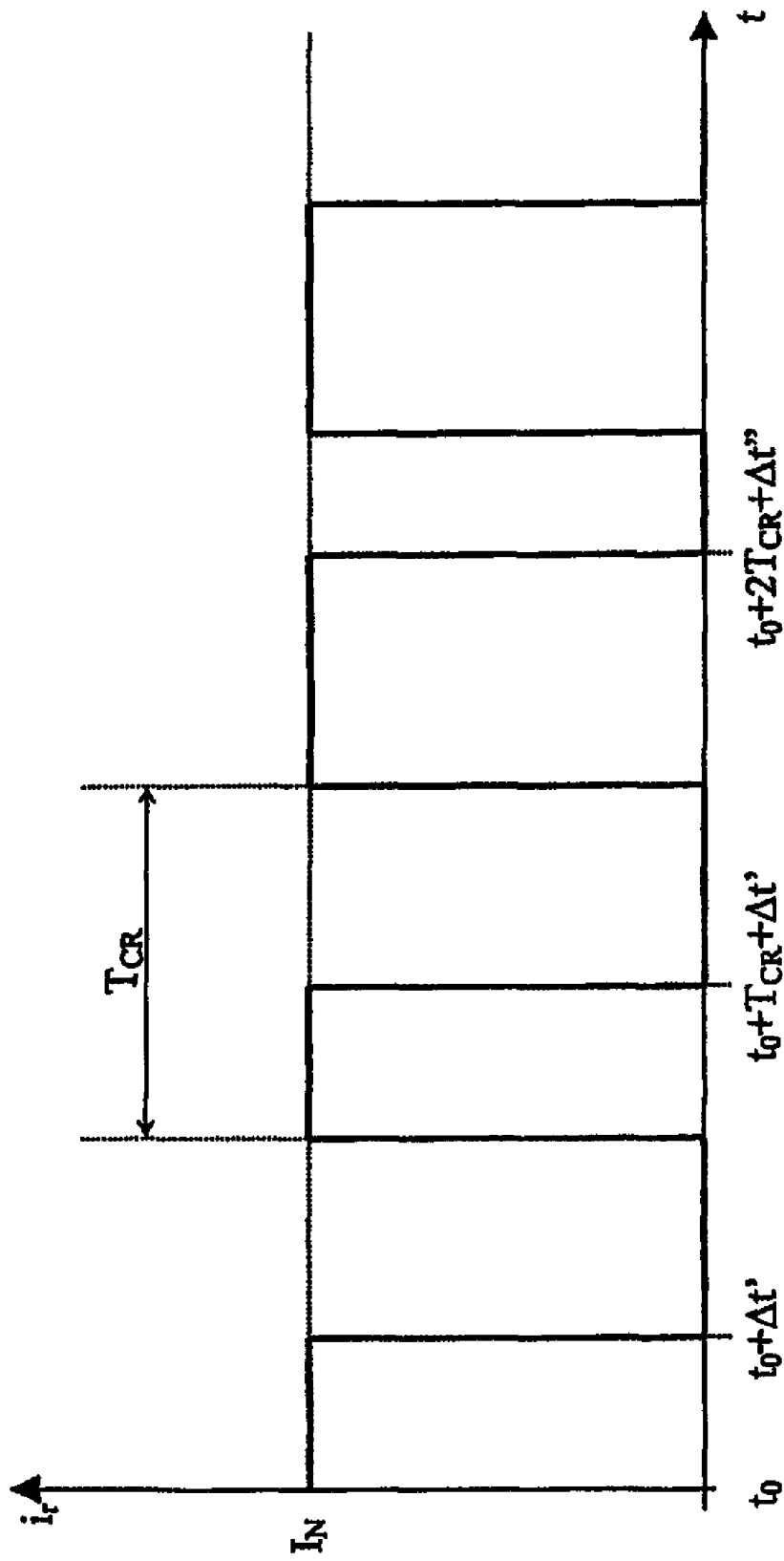
FIG. 3 is a simplified time diagram of an electric quantity considered particularly significant.

In this connection, FIG. 3 shows a simplified time diagram, in which the branch current $i_r$ is represented in the ordinate and the time "t" in the abscissa: as it will become clear in the specification, the control unit CE, on the basis of the signal received from the second sensor $S_2$, calculates the time when the branch switch $K_R$ must be commuted from closed (in which a current equal to about the nominal one $I_N$ circulates) to open (in which obviously, no current $i_r$ circulates in the branch R), and vice versa, adjusting consequently the operation of the switch $K_R$. In the example shown in the same FIG. 3, the commutation of the switch $K_R$ from closed to open must occur at time moments: $t_0+\Delta t'$, $t_0+T_{CR}+\Delta t'$, $t_0+2T_{CR}+\Delta t''$, etc., where $t_0+K^*T_{CR}$ with K being a generic integer, which are strictly connected to the signal transmitted by the second sensor $S_2$ to the control unit CE. In the example shown in FIG. 3, beginning from the represented third commutation period $T_{CR}$ the pulsating branch current $i_r$ must be maintained at its nominal value for a longer time with respect to the first two preceding periods, due to a bigger demand of the runway lighting asked by the control tower.

It is specified that FIG. 3 has a purely illustrative character. It does not show, for sake of simplicity, the response times of the switch $K_R$ and the relative commutation times. Moreover, the branch current $i_r$, with the switch $K_R$ closed, is shown to be equal to $I_N$, while actually it varies due to the regulation action of the control unit CE, as it will be explained later, within the value interval: $I_N-\Delta i_r/2 < i_r < I_N+\Delta i_r/2$, where $\Delta i_r$ is a value, as it is known to those skilled in the field, which can be set and is never null, stored in the control unit CE. In other words, the control unit CE "constructs" a time diagram of the pulsating branch current $i_r$ of the type shown in FIG. 3, on the basis of the information acquired by the signal transmitted by the second sensor S2, and acts on the switches $M_1$, $M_2$, $K_R$ in a way that will be described later, so as to obtain a real trend of the current $i_r$ (which is sent to the control unit CE through the feedback control signal transmitted by the first sensor $S_1$) that is as close as possible to the calculated model.

As a pure, not limiting example it can be assumed that the commutation frequency $f_{CM}$ of the switches $M_1$, $M_2$ is much higher than the commutation frequency $f_{CR}$ of the branch switch $K_R$ (equal to the inverse of the cited commutation period $T_{CR}$), in turn much higher than the frequency $f_z$ of the imposed current $i_z$ ($f_{CM} \gg f_{CR} \gg f_z$).

By convention, if the half-wave of the induced current is assumed positive, when the potential difference between the first input terminal A and the second input terminal B is positive, the first diode $DS_1$ enables the conduction and the control unit CE operates the closing of the second switch $M_2$, designed to remain in conduction condition for the whole half-cycle $T_z/2$ (with $T_z$ equal to the inverse of the frequency $f_z$ of the imposed current $i_z$), to allow the current to pass to the corresponding branch GB (FIG. 2). The first switch $M_1$ is opened and closed by the control unit CE at the commutation frequency $f_{CM}$ with a duty cycle (as known defined by a ratio between the conduction interval and the commutation one $T_{CM}=1/f_{CM}$) that depends in particular on the branch current $i_r$ actually circulating along the branch R. In particular, if the branch switch $K_R$ is closed, for example because the control unit CE must impose a branch current $i_r$, close to $I_N$ in the time interval included between the $t_0$ and $t_0+\Delta t'$ (FIG. 3), the duty cycle of the first switch $M_1$ is made to change according to the current $i_r$ detected in the branch R, so that the latter reaches rapidly the value $I_N$, in the case $t=t_0$ or remains about values near to $I_N$ (precisely, as said, $I_N-Ai_r/2<i_r<I_N+Ai_r/2$) in the interval $t_0<t<t_0+\Delta t'$: actually, when the first switch $M_1$ is open, the electric bridge ABHG behaves the same as a diode rectifier bridge (but with reduced losses, since the conduction losses on the branch GB are much lower with respect to those of a diode, given the presence of a MOSFET element) and the current $i_p$ in the bridge inlet supplies the capacitor C and the branch R, while, when the first switch $M_1$ is closed, a short circuit occurs between the input terminals A and B, which does not allow the current $i_p$ to pass through the bridge ABHG, with consequent reduction of the branch current $i_r$, now supplied only by the capacitor C, according to discharge transient of the latter.

When the electric control unit CE operates the opening of the branch switch $K_R$, the current $i_p$, passing through the bridge ABHG, returns only through the capacitor C.

Similar considerations are valid on the operation of the proposed device DA in the subsequent commutation cycles $T_{CR}$, with regard to, for example, FIG. 3.

Likewise, when the induced current $i_j$, changes the polarity (from positive to negative) and thus the potential difference between the input terminals A and B becomes negative, the second diode $DS_2$ begins the conduction and the control unit CE operates the permanent closing of the first switch $M_1$, aimed at remaining in conduction for the whole subsequent half-cycle $T_z/2$, to allow the current to pass through the corresponding branch GA (FIG. 2). Quite similarly to what has been described above, the control unit CE will operate the opening and closing of the second switch $M_2$, according to the value of the current $i_r$, which must be supplied to the branch R.

When the current in the bridge $i_p$, input passes through zero or is close to this value, the capacitor C supplies to the branch R a part of current necessary for optimal power supplying of the LED diodes, in accordance to what has been just described with regard to the operation of the proposed device DA.

It is possible to provide, instead of, or in addition to the first sensor $S_1$, situated on the branch R, one or more luminosity sensors, associated to the corresponding LED diodes and connected to the control unit CE, for detecting the intensity of the radiation emitted by the same LED diodes, in order to optimize the operation of the supply device DA.

It is specified that the device DA proposed by the present invention can work in optimal way also if the information associated to the lighting level required in the runway is reported to the frequency $f_z$ rather than to the effective RSM value of the imposed current $i_z$.

The advantage of the present invention lies in the fact that it has defined a supply device for LED diodes, which is newly conceived and distinguished, with respect to the solutions of known type, by a very limited number of electronic elements, with all the positive consequences thereof. Actually, this is followed by a correlate and decisive increase of the reliability of the same device, a reduction of the energy losses (and consequently of the energy costs) and an as much important reduction of the production costs.

Figure 4:
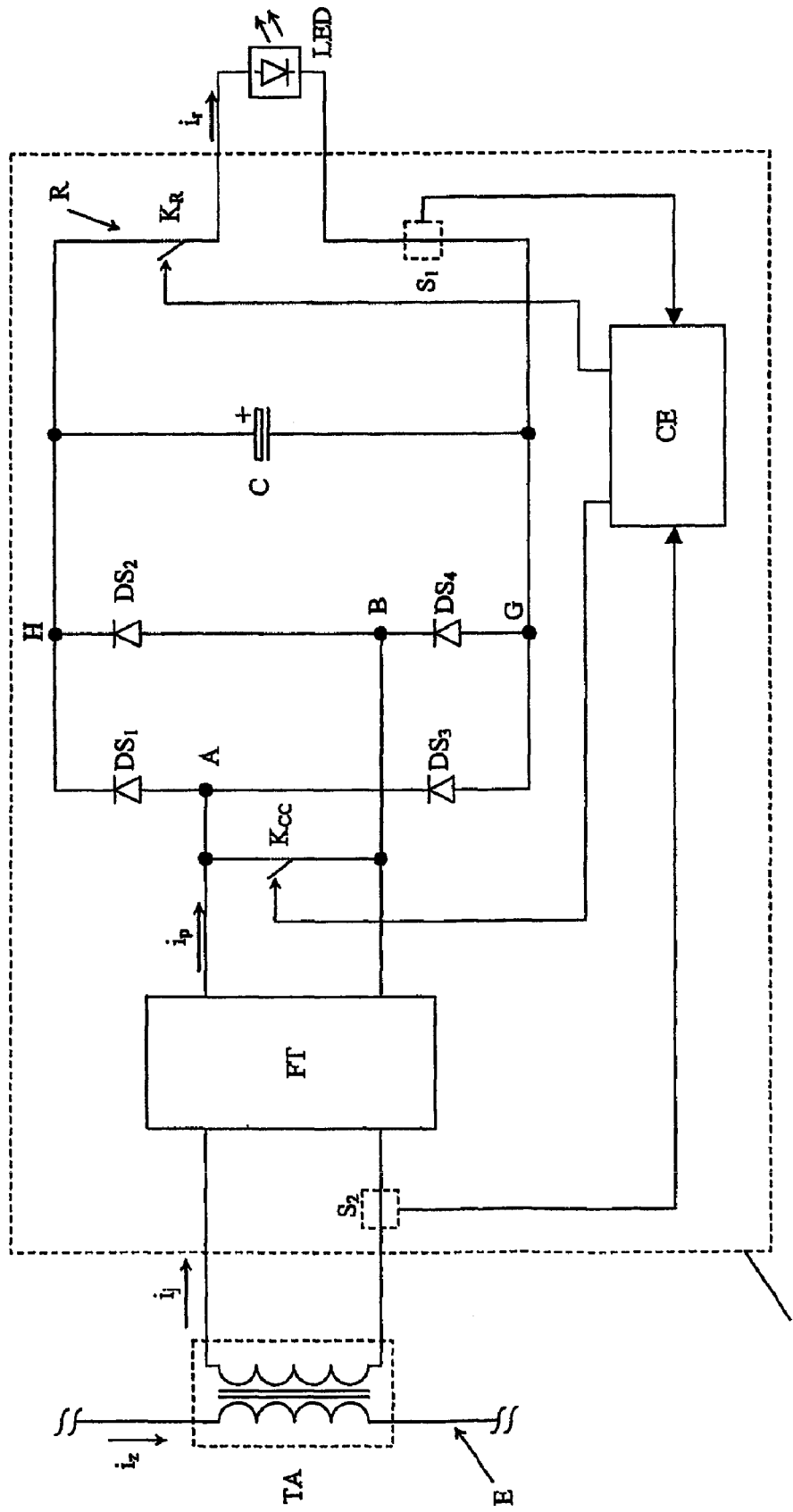
FIG. 4 is a block diagram of a light source SI, including the supply device DA, proposed by the present invention, according to a different embodiment.

FIG. 4 shows an embodiment of the device proposed by the present invention. The electric bridge of FIG. 3 has been substituted with a diode rectifier bridge (for example Schottky diodes), with a short circuit switch $K_{cc}$ situated upstream and connected between the input terminals A and B of the same bridge. The switch $K_{cc}$, operated by the control unit CE, substitutes functionally the first switch $M_1$ and the second switch $M_2$ in during the positive and negative half-wave of the induced current $i_j$, respectively, in order to obtain a value of the branch current $i_r$, close to $I_N$ (precisely $I_N-Ai_r/2<i_r<I_N+Ai_r/2$) when the branch switch $K_R$ is closed.

It is understood that what above, has been described as a not limiting example, therefore possible practical-application variants remain within the protective scope of the invention as described above and claimed below.

The invention claimed is:

1. A device for supplying power to LED diodes, the device being powered by an electric source supplying an alternating current ($i_z$), characterized in that it includes:
    an electric bridge (ABHG), having a first (A) and a second (B) input terminal supplied by said electric source, including in turn:
    a first element ($DS_1$), interposed between said first input terminal (A) and a first output terminal (H) of said bridge (ABHG), for unidirectional conduction of current from said first input terminal (A) to said first output terminal (H);
    a second element ($DS_2$), interposed between said second input terminal (B) and said first output terminal (H), for unidirectional conduction of current from said second input terminal (B) to said first output terminal (H);
    a first switch ($M_1$), interposed between said first input terminal (A) and a second output terminal (G) of said electric bridge (ABHG), for conduction of current between said first input terminal (A) to said second output terminal (G);
    a second switch ($M_2$), interposed between said second input terminal (B) and said second output terminal (G), for conduction of current between said second input terminal (B) to said second output terminal (G);
    a capacitor element (C) of predetermined value connected between said first (H) and second (G) output terminals of said electric bridge (ABHG);
    a branch (R) connected between said first (H) and second (G) output terminals of said electric bridge (ABHG), along which there are arranged in cascade a switch ($K_R$), one or more said LED diodes arranged in series and/or in parallel, with their anodes oriented toward said first output terminal (H), and sensor means connected to said branch (R) for detecting a representative physical quantity, associated to the latter;
    and an electric control unit (CE), which receives in input the feedback control signal, coming from said sensor and is aimed at controlling the opening/closing of said first ($M_1$) and second ($M_2$) switch, as well as of said branch switch ($K_R$), depending on said alternating current ($i_z$) trend and to obtain a predetermined trend of said branch current ($i_r$) for supplying said LED diodes.

2. A device, according to claim 1, characterized in that said sensor means, associated to said branch (R) are constituted by a first current sensor ($S_1$), arranged in cascade on the branch (R) and connected to said electric control unit (CE), said first current sensor transmitting to the electric control unit a representative signal of said current ($i_r$) circulating in the same branch (R).

3. A device, according to claim 1, characterized in that said sensor means, associated to said branch (R) detect the intensity of light radiation emitted by said LED diodes and are connected to said electric control unit (CE).

4. A device, according to claim 1, characterized in that it includes also a second current sensor ($S_2$), situated upstream of said electric bridge (ABHG) and transmitting to said electric control unit (CE) a representative signal of said alternating current ($i_z$), which is supplied by said electric source, with determined operation information associated to said alternating current ($i_z$).

5. A device, according to claim 4, in particular supplied by the secondary winding of a current transformer (TA) powered on the primary winding by said alternating current ($i_z$) electric source, characterized in that said second sensor ($S_2$) is situated on the electric line supplied by said secondary winding of said transformer (TA).

6. A device, according to claim 4, characterized in that it includes also a filter (FT) for reducing harmonic distortion produced by the same device (DA), situated upstream of said electric bridge (ABHG).

7. A device for supplying power to LED diodes, the device being powered by an electric source supplying an alternating current ($i_z$), characterized in that it includes:
- an electric bridge (ABHG), having a first (A) and a second (B) input terminal supplied by said electric source, including in turn:
- a first element ($DS_1$), interposed between said first input terminal (A) and a first output terminal (H) of said bridge (ABHG), for unidirectional conduction of current from said first input terminal (A) to said first output terminal (H);
- a second element ($DS_2$), interposed between said second input terminal (B) and said first output terminal (H), for unidirectional conduction of current from said second input terminal (B) to said first output terminal (H);
- a third element ($DS_3$), interposed between said first input terminal (A) and a second output terminal (G) of said bridge (ABHG), for unidirectional conduction of current from said second output terminal (G) to said first input terminal (A);
- a fourth element ($DS_4$), interposed between said second input terminal (B) and said second output terminal (G), for unidirectional conduction of current from said second output terminal (G) to said second input terminal (B);
- a short circuit switch ($K_{cc}$), derived between said first (A) and second (B) input terminals of said electric bridge (ABHG);
- a capacitor element (C) of predetermined value, derived between said first (H) and second (G) output terminals of said electric bridge (ABHG);
- a branch (R), derived between said first (H) and second (G) output terminals of said electric bridge (ABHG), along which there are arranged in cascade at least a switch ($K_R$), one or more said LED diodes arranged in series and/or in parallel, with their anodes oriented toward said first output terminal (H), and sensor means connected to said branch (R) for detecting a representative physical quantity, associated to the latter;
- and an electrical control unit (CE) which receives in input the feedback control signal, coming from said sensor and is aimed at controlling opening/closing of said short circuit switch ($K_{cc}$), as well as of said branch switch ($K_R$) as a function of said alternating current ($i_z$) trend and in order to obtain a predetermined trend of said branch current ($i_r$) for power supplying said LED diodes.

8. A device, according to claim 1, characterized in that said first ($DS_1$) and second ($DS_2$) element for unidirectional conduction of current respectively from said first input terminal (A) to said first output terminal (H) and from said second input terminal (B) to said first output terminal (H), include corresponding diodes ($DS_1$, $DS_2$) having their catode oriented toward said first output terminal (H).

9. Device, according to claim 8, characterized in that said diodes are of Schottky type.

10. A device, according to claim 1, characterized in that said first ($M_1$) and second ($M_2$) switches for conduction of current respectively between said first input terminal (A) and said second output terminal (G) and between said second input terminal (B) and said second output terminal (G), include corresponding MOSFET elements, having their GATEs connected to said electric control unit (CE).

11. Device, according to claim 1, characterized in that said capacitor element (C), derived between said first (H) and second (G) output terminals, is arranged with the positive pole turned toward said first output terminal (H).

12. A device, according to claim 1 or 7, characterized in that it includes also a filter (FT) for reducing harmonic distortion produced by the same device (DA), situated upstream of said electric bridge (ABHG).

13. A device, according to claim 7, characterized in that said first ($DS_1$) and second ($DS_2$) elements for unidirectional conduction of current respectively from said first input terminal (A) to said first output terminal (H) and from said second input terminal (B) to said first output terminal (H), include corresponding diodes having their catode oriented toward said first output terminal (H), and in that said third ($DS_3$) and fourth ($DS_4$) element for unidirectional conduction of current respectively from said second output terminal (G) to said first input terminal (A) and from said second output terminal (G) to said second input terminal (B) include corresponding diodes having their anode oriented toward said second output terminal (G).

14. Device, according to claim 13, characterized in that said diodes are of Schottky type.

15. A device, according to claim 7, characterized in that said sensor means, associated to said branch (R) are constituted by a first current sensor ($S_1$), arranged in cascade on the branch (R) and connected to said electric control unit (CE), said first current sensor transmitting to the electric control unit a representative signal of said current ($i_r$) circulating in the same branch (R).

16. A device, according to claim 7, characterized in that said sensor means, associated to said branch (R) detect the intensity of light radiation emitted by said LED diodes and are connected to said electric control unit (CE).

17. A device, according to claim 7, characterized in that it includes also a second current sensor ($S_2$), situated upstream of said electric bridge (ABHG) and transmitting to said electric control unit (CE) a representative signal of said alternating current ($i_z$), which is supplied by said electric source, with determined operation information associated to said alternating current ($i_z$).

18. A device, according to claim 7, characterized in that it includes also a filter (FT) for reducing harmonic distortion produced by the same device (DA), situated upstream of said electric bridge (ABHG).

19. Device, according to claim 7, characterized in that said capacitor element (C), derived between said first (H) and second (G) output terminals, is arranged with the positive pole turned toward said first output terminal (H).

* * * * *